United States Patent [19]

Janson et al.

[11] 3,822,672

[45] July 9, 1974

[54] MILKING INSTALLATION FOR COW STABLES

[76] Inventors: Stig Janson; Ulf Stig Janson, both of Ryholms Gods, Moholm, Sweden

[22] Filed: May 9, 1972

[21] Appl. No.: 251,733

Related U.S. Application Data

[62] Division of Ser. No. 885,097, Dec. 15, 1969, Pat. No. 3,683,856.

[30] Foreign Application Priority Data

Dec. 19, 1968 Sweden............................ 17489/68

[52] U.S. Cl. ............................................. 119/14.11
[51] Int. Cl........................ A01j 05/00, A01j 09/08
[58] Field of Search............ 119/14.11, 14.03, 14.04

[56] References Cited
UNITED STATES PATENTS

| | | | |
|---|---|---|---|
| 1,494,138 | 5/1924 | Shippert et al. ................. | 119/14.11 |
| 2,469,519 | 5/1949 | Redin et al. ..................... | 119/14.03 |
| 3,402,699 | 9/1968 | Cain............................... | 119/14.04 |

Primary Examiner—James H. Czerwonky
Attorney, Agent, or Firm—Young & Thompson

[57] ABSTRACT

A milking installation for a milking stable having a line of milking stations for cows arranged side-by-side, comprising a number of teat cup clusters, each of which has teat cups manually interconnectible by hoses to milk and vacuum pipes. The clusters being mounted on a carriage which moves along the milking stations. The clusters are movable relative to the carriage on a guideway. During an inactive phase of the movement of the clusters relative to the carriage, the clusters are automatically disconnected from the cows and from the milk and vacuum pipes; while during an active phase of the same movement they may be manually connected to the cows and to the milk and vacuum pipes.

13 Claims, 17 Drawing Figures

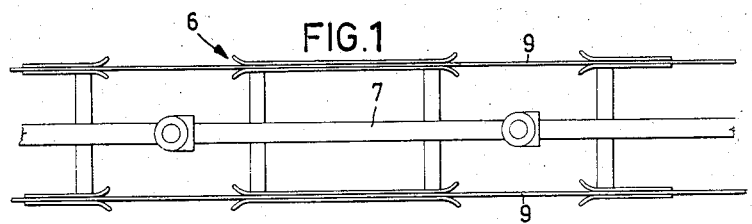
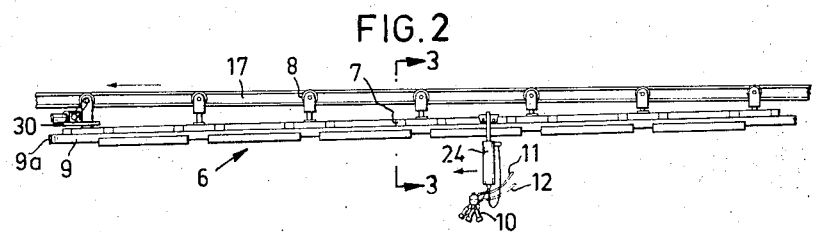
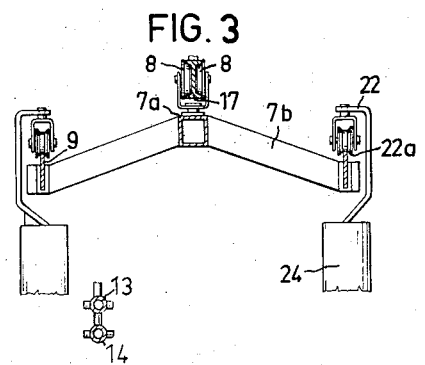
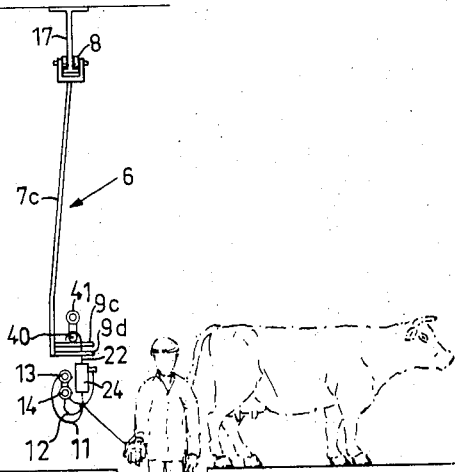
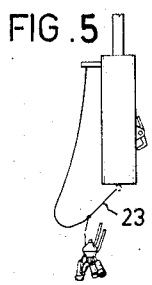
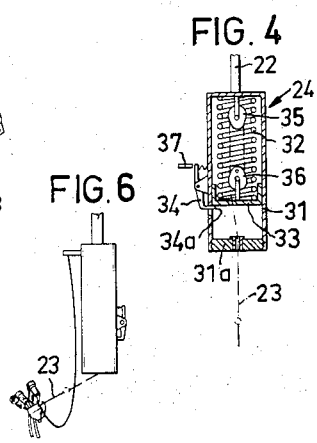
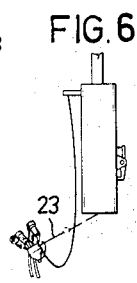
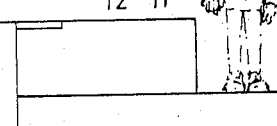

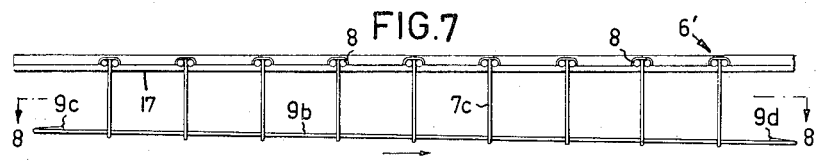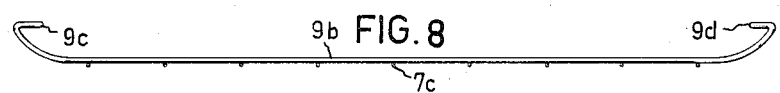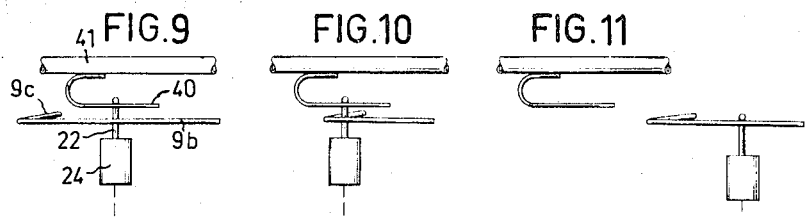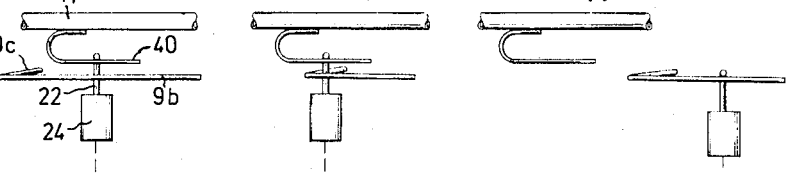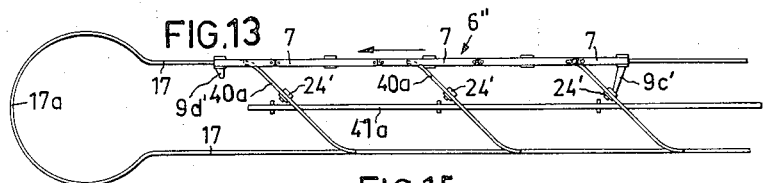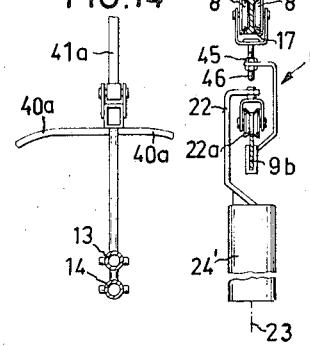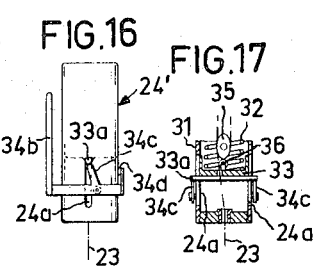

MILKING INSTALLATION FOR COW STABLES

This application is a division of our copending application Ser. No. 885,097, filed Dec. 15, 1969, now U.S. Pat. No. 3,683,856.

This invention relates to milking installations.

There are known milking installations with milking stations disposed side by side, comprising a number of teat cup clusters including teat cups and hoses, which teat cups are connected or connectible to a milk pipe and a vacuum pipe by the hoses. The teat cup clusters are supported by a carriage which is movable along the milking stations and so arranged that the teat cup clusters are movable relatively to the carriage.

In the said installation the teat cups clusters can be movable relative to the carriage on a guideway supported by the carriage, said guideway having one or more portions parallel with the direction of its displacement and having possibly bent end portions, so that an endless guideway is formed. The teat cup clusters are then movable relative to the carriage in such a manner, that during the displacement of the carriage the clusters remain stationary relative to the milking stations on a portion of the guideway facing the milking stations. If the guideway has a portion running on the opposite side, the clusters will, when they are released from the cows, move along said opposite side at about twice the speed of the carriage.

An embodiment of said type of milking installation which works best from several points of view is obtained if the number of teat cup clusters and the velocity of the carriage are so related that the time for moving the carriage along a number of milking stations corresponding to half the number of teat cup clusters and the time taken for the positioning of the teat cups at each of these milking stations corresponds approximately to the average milking time of one cow or slightly exceeds said time.

It has been found that a milking installation of the said type can be made still more effective and simple so as to permit its economical use even in smaller stables, and, if it is used in larger stables, to render it still more advantageous.

According to the invention there is provided a milking installation for stables with milking stations disposed side by side, which installation comprises a number of teat cup clusters including teat cups and hoses, which teat cups are connected or connectible to a milk pipe and a vacuum pipe by the hoses, said clusters being supported by a carriage which is movable along the milking stations and relative to which the clusters are movable, said carriage being provided with a guideway comprising one or more essentially rectilinear sections on which guideway the clusters are movable relative to the carriage, characterized in that the teat cup clusters, during a phase of their movement relative to the carriage, are disconnected from the milk and vacuum pipes.

By the invention it becomes possible to eliminate such eventual flexible vacuum and milk pipes, which in the said earlier type of milking installation are necessary for connecting the milk and vacuum ducts partaking in the movements of the carriage with a collector tank for the milk. In large stables with a large number of milking stations these ducts may have a great length which renders the installation more complicated. Compared with the said earlier milking installation, in which the milk and vacuum pipes follow with the movements of the carriage in an endless path having a portion running parallel to the direction of movement of the carriage and facing the milking stations, and a portion opposite said first portion and similarly parallel to the direction of movement of the carriage, and in which a central collector tank for the milk and a source of vacuum, for example a pump, is placed on the carriage, the advantage is obtained by the invention that such pipings which are necessary for connecting the movable milk and vacuum pipes with said tank and pump are entirely avoided.

The invention presents the possibility of mounting the milk and vacuum pipes fixedly relative to the milking stations, the teat cup clusters being arranged for disconnection from the milk and vacuum pipes and from the teats of the cows when in a predetermined position with regard to the carriage.

The disconnecting can be effected by means of valves in the milk and vacuum pipes whereby a change of the position of a valve results in its closure. The closure of the vacuum valve results in a loosening of the teat cups from the teats of the cow, which results in a hoisting of the teat cup clusters into a transport position, in which, after completed transport along the guideway, they are easily accessible to the milking operator. The closure of the valves can be produced in different manners, for example, mechanically, by the rear part of the carriage abutting a control member for the valve, or by the hoses of the clusters being stretched in connection with the movement of the carriage relative to the clusters.

In a preferred embodiment of the invention the carriage has a guideway fixedly mounted thereon in the form of a rail or the like on which the teat cup clusters are movably supported. Chains or like means for supporting and transporting the clusters relative to the carriage can thereby be avoided. Instead the rail or the like, has a portion running essentially parallel to the moving direction of the carriage and essentially corresponding to the length of the carriage.

If it is preferred to let the teat cup clusters move in a closed path along the carriage, the rail or the like, in another embodiment has an essentially rectilinear portion facing the milking stations and an opposite, essentially rectilinear portion and curved end portions connecting these portions.

A further simplification can be obtained, if the portion of the guideway, on which the disconnected teat cup clusters move, is inclined in the direction of motion of the carriage. The clusters will then move under the action of gravity one by one to the forward end of the carriage where the milking operator is stationed and where the clusters become easily accessible to him.

An embodiment of the invention, in which the carriage is provided with an endless guideway, is characterized in that the portion of the guideway, situated nearest the milking stations, is inclined upwards from the forward to the rearward end of the carriage. When the carriage moves past the milking stations with the teat cup clusters essentially motionless with regard to the milking stations, the suspending means for the clusters will be successively lifted, so that when they are finally disconnected after the milking operation is completed, they have reached their highest position and thereafter on the other side of the guideway will roll forward to the fore end of the carriage where the milking operator is standing.

Still a further simplification can be obtained if the carriage supports a preferably hook-shaped portion provided for cooperation with a suspending means for the teat cup clusters so mounted that, during the passage of the hook-shaped portion of the carriage, a cluster suspended near the carriage is caught and carried away with the carriage. In this case it is appropriate that said preferably hook-shaped portion of the carriage forms a part, preferably an end portion, of the guideway for the clusters or is mounted immediately adjacent to said guideway.

In this embodiment the milking operator lifts the suspending means from the guideway of the carriage and applies them near the path of motion of the guideway in connection with which the hoses of the teat cup clusters are connected to the milk and vacuum pipes and the teat cups are positioned. The carriage as well as the guideway can thereby be essentially simplified and the carriage can consist of rods which have rollers mounted at their upper ends and which support at their lower ends a sliding track in the form of a number of tube sections preferably hingedly connected to each other, which slide track can be arranged with an inclination in the direction of motion of the carriage. The hook-shaped guideway portion at the rear end of the carriage will, when the carriage is moving forward, pick up the suspending members of the teat cup clusters, so that these are transferred to the guideway, on which, because of its inclination and the action of gravity, they will move to the forward end of the carriage, where the milking operator is placed. The sliding track at its forward end is preferably provided with a pick-up device, for example a hook, for the clusters.

The device onto which the clusters are suspended, can consist of a tube mounted in fixed relation to the stalls adjacent the path of motion of the carriage, said tube supporting a suspending hook in front of each of the milking stations. This tube mounted in fixed relation to the stalls might possibly consist of the vacuum or the milk pipe. It is, however, appropriate to make the tube and/or the guideway of the carriage adjustable in height to permit a simple adaptation of the cooperating parts. The carriage should likewise, in the cases where it has an inclined guideway, have appropriate adjusting members for the adjustment of the inclination.

As in the said earlier type of milking installation, the carriage should preferably consist of several sections hingedly connected to each other, especially in those cases where the milking stations are formed of rows of stalls running parallel to each other.

Specific embodiments of the invention will now be described by way of example with reference to the accompanying drawings, in which:

FIG. 1 shows a top plan view of a carriage for a milking installation in one embodiment of the invention;

FIG. 2 is a side view of a carriage shown in FIG. 1;

FIG. 3 is a vertical section taken along the line 3—3 of FIG. 2;

FIG. 4 is a vertical section through a spring roller box for the suspension means of the teat cup clusters;

FIGS. 5 and 6 are side views of the spring roller box shown in FIG. 4 with the clusters in different positions;

FIG. 7 is a diagrammatic side view of a modified carriage for a milking installation in which the carriage has a single sliding track for disconnected teat cup clusters;

FIG. 8 is a section taken along the line 8—8 in FIG. 7;

FIGS. 9 to 11 illustrate how the carriage carries away a suspension means for a teat cup cluster placed near a milking station;

FIG. 12 is a detailed elevational view showing a milking station at which the forward end of the carriage shown schematically in FIG. 7 has just arrived.

FIG. 13 is a plan view of a carriage for a milking installation in a further embodiment of the invention;

FIG. 14 shows a detail of the suspension arrangement;

FIG. 15 is a cross-sectional view of the carriage with a spring box suspended from its guide rail;

FIG. 16 is an elevational view of a spring box; and

FIG. 17 is a cross-sectional view of part of the box shown in FIG. 16.

The carriage in the various embodiments shown is intended particularly for use with a stall arrangement as described in the above-identified application.

As shown in FIGS. 1 to 3, a carriage 6 is movable along a row of stalls or milking stations, which carriage consists of a number of hingedly interconnected sections 7. Each of said sections serves to support a teat cup cluster in the form of teat cups 10 manually connectible by flexible hoses 11, 12 to a milk pipe 13 and to a vacuum pipe 14. The carriage 6 is movable along a rail 17 suspended from the roof of the stables. Each of the sections 7 has for this purpose two upper wheels 8 running on the rail 17. Each section has further a guideway in the form of a rail 9 which can consist of supporting beams of appropriate material. The guideway has a part which is situated near the milking stations and runs parallel to the direction of movement of the carriage, and the guideway is supported by supporting brackets 7b extending obliquely downwards from a central frame beam 7a. As shown in FIG. 2, the guideway 9 is inclined downwards in the direction of motion of the carriage. Because thereof the supporting members of the teat cup clusters, which members will be described in more detail further on, are movable under the action of gravity towards the forward end of the carriage (as seen in the direction of movement of the carriage), when the milk and vacuum hoses of the clusters are disconnected from the vacuum and milk pipes and the teat cups have fallen off the udders of the cows and are hoisted to its transport position, for example as a result of the fact that the rear part of the carriage has abutted a conventional control member (not shown) for closing the valves in the milk and vacuum pipes and that the supporting members have hoisting means.

Further the clusters which are connected by the operator placed at the forward end of the carriage, will successively be raised since these clusters remain motionless relative to the milking stations while the carriage with its inclined guideway parts 9 is moving forwards.

When the carriage has moved so far forwards in relation to a cluster that the latter is at the rear end of the carriage where the guideway 9 goes over into a bent end portion (not shown) but similar to 9a, the above-mentioned conventional control member is provided to close a valve in a connection of the vacuum pipe 14, to which the vacuum hose 12 is connected, whereby the teat cups 10 are released from the udder of the cow and the hoses 11 and 12 are removed from their respective hose connections by the hoisting means, for example the spring box roller 24 in FIG. 2, belonging to the supporting member. The closing of said valve in the vacuum pipe can be effected in any appropriate manner, for example by pulling the hose 12, or by the fact that the rear part of the carriage hits a control member for the valve or the like. Even electrically, photoelectrically or pneumatically controlled means can be used for this purpose. Once a cluster at the rear curved end portion of the guideway 9 has been disconnected from the milk and vacuum pipes for example in the way hereinbefore mentioned it is free to pass about the curved end portion of the guideway and to run under the action of gravity along the downwardly inclined run of the guideway 9 on the side of the carriage 6 remote from the milking stations. The cluster will thus reach the front end of the carriage where it is available to the operator.

The average time for milking a cow is normally about 4.5 minutes and the number of sections 7 of the carriage 6 and the moving speed of the carriage are adapted in such manner that it takes about the above said time to position all the cows as many teat cup clusters as there are on the side of the endless guideway turned towards the milking stations. If the carriage for example has eight sections, a time slightly exceeding 4.5 minutes will elapse before all eight clusters have been connected and the first cluster, in the manner indicated above, is released upon continued movement of the carriage and is disconnected from the milk and vacuum pipes in the way hereinbefore mentioned and will move along the part of the guideway situated on the side of the carriage remote from the milking stations, which movement, being produced under the action of gravity, can be so fast that this cluster can be very quickly reused for a new connection.

The carriage 6 can be moved manually for example by means of a winch, a pulling chain or the like or even, if desired, be driven continuously or stepwise along the stalls by means of a motor 30.

FIGS. 4 to 6 show an embodiment of a suspending device for the teat cup clusters 10, 11, 12 which device is movable along the guideway 9 and consists of a spring roller box 24 with a suspending member 22 with rollers 22a and a suspension line 23 for the cluster. The spring roller box consists of an outer cylinder 31, within which an inner cylinder 33 is movable under the action of a spring 32, the movements of the inner cylinder under the action of the spring 32 being limited by a stop member 34 with an operating pin 34a passing through the wall of the cylinder 31 to the outside thereof. The suspension line 23 passes through an end wall 31a of the outer cylinder and is wound on a system of pulleys 35, 36 mounted in and between the two cylinders 31, 33. The stop member 34 is operable by a cam 37 or the like on the rear part of the carriage 6. When the stop member 34 is released, the inner cylinder 33 is moved towards the end wall 31a of the outer cylinder which produces the winding in of the line 23 and lifts the teat cup cluster into a transport position as shown in FIG. 5. In connection with the positioning of the teat cups when the spring roller box 24 has moved to the forward end of the carriage, the milking operator pulls the line 23 out whereby the spring roller box is restored to the position illustrated in FIGS. 4 and 6.

Instead of forming the guideway 9 with a downwards inclination, an appropriate driving means can be used to move the spring boxes and the teat cup clusters from the rear end of the carriage to its forward end.

FIGS. 7 and 8 show diagrammatically a further embodiment of the milking installation in which the sections 7 of the carriage comprise vertical tubes or standards 7c which at their upper end are provided with wheels or rollers 8, which as in the previous embodiment run along a rail 17 suspended at the roof of the stables. The standards 7c support at their lower part a sliding track 9b which is inclined towards in the direction of motion of the carriage and which is placed essentially directly below the rail 17. In this embodiment the carriage thus does not support an endless guideway but only a sliding track extending from the forward end of the carriage to its rear end. At its ends the sliding track 9b terminates in hook-shaped portions 9c and 9d, the purpose of which will be explained later on.

When the milking operator, at the forward end of the carriage 6', positions the teat cups on a cow at one of the milking stations, he lifts the spring roller box 24 from the carriage and hangs it on a suspending hook 40 which is fixedly mounted on a tube 41 running along the path of motion of the carriage. The spring box hangs there during the time of 4.5 minutes necessary for the performance of the milking operation and for the entire carriage 6' to pass the said milking station. FIGS. 9 to 11 illustrate how the hook-shaped end portion 9c of the sliding track 9b moving together with the carriage grips around the suspending member 22 of the spring roller box 24, so that the latter is disengaged from the suspending hook 40 and falls onto the inclined portion 9b of the track. While the carriage and said track portion 9b are moving forwards, the spring roller box will simply slide under the action of gravity along the track portion to the forward end of the carriage where the teat cup cluster connected to the spring roller box will be ready for new use. The bent forward end portion 9d of the sliding track 9b serves to take up the spring roller boxes in their movement relative to the carriage. The milk or vacuum pipe 13 or 14 could be utilized to serve as the tube 41 extending along the path of motion of the carriage 6' and on which the suspending hooks 40 are fastened. It will be recognized that by applying the principle illustrated in FIGS. 7 to 12, the milking installation can be given an extremely simple construction and in spite thereof will yield fully satisfactory efficiency, so that the work of the milking operator will be limited to the supervision of the milking process and the fitting of the teat cups and hoses, other operations being performed essentially automatically.

FIGS. 13 to 17 show a modification of the embodiment shown in FIGS. 7 to 12. The milking installation is here intended for use in a stable with two parallel rows of stalls for which reason the rail 17 suspended in the roof has a bent end portion 17a on which the carriage 6'' passes on its travel from one of the stall rows to the other. The spring boxes 24' of the teat cup clusters are adapted to be hung up on suspending hooks 40a of reversed S-shape extending obliquely between the parts of the path of movement of an inclined guideway 9b carried by the carriage. The suspending hooks 40a are carried by supporting links 41a mounted in the roof and which can be hoisted or lowered. The rear portion of the carriage has a push member 9c' which during movement of the rear portion past the milking stations pushes the spring roller boxes one by one to roll on the hooks 40a and over to the inclined guideway 9b on the carriage 6'' where said boxes roll forward to the fore end of the carriage for renewed utilization. An abutment member 9d' prevents the spring roller boxes from rolling off the carriage. The push member 9c' serves simultaneously as a catch releaser for the spring roller boxes, which, as shown in FIGS. 15 and 16, have a modified form compared with that of FIG. 4. The push member 9c' actuates a lever 34b whereby a catch member 34c releases an abutment 33a mounted onto the inner cylinder 33, so that the latter can move along a slot 24a and the cylinder 33 thereby can move downwards and the line 23 can be wound in. A locking member 34d guarantees the correct initial position when the spring box is again hung on a suspending hook 40a by the milking operator. Since the carriage 6'' consists of hingedly interconnected sections, it can follow around the bent guideway portion 17a. It will be seen from FIG. 13 that the arrangement of the suspending hooks is such that the push member 9c' will always push the suspended spring roller boxes towards that side on which the carriage is travelling.

The portion of the carriage 6'' combined with the guideway 9b is adjustable in height relative to the carriage portion supporting the rollers 8 by means of a screw unit 45, 46.

Different modifications are possible within the scope of the invention as it is defined in the claims.

Having described our invention, we claim:

1. A milking installation comprising a milking stable having a line of milking stations for cows arranged side-by-side, a plurality of teat cup clusters each having teat cups and hoses connected thereto, means for manually connecting the hoses to a milk pipe and a vacuum pipe, a carriage supporting said clusters, means mounting said carriage for movement along said line of milking stations, said carriage having a guideway extending generally in the direction of movement of the carriage and on which guideway the clusters are movable relative to the carriage, said guideway comprising a rail fixedly mounted on said carriage, said clusters being movable on said rail relative to the carriage.

2. A milking installation as claimed in claim 1, said guideway comprising a pair of said rails one of which extends along said stations and and the other of which is opposite and parallel to said one rail, said rails being interconnected by curved end portions.

3. A milking installation as claimed in claim 2, the rail on which the disconnected clusters move being downwardly inclined in the direction of movement of the carriage.

4. A milking installation as claimed in claim 3, a portion of the rail nearest the milking stations being inclined upward from the forward end to the rear end of the carriage.

5. A milking installation as claimed in claim 1, and suspending means suspending said clusters, rollers by which said suspending means are mounted for movement along the guideway, and means to hoist the clusters to a lifted transport position upon disconnection of the clusters from the cows and from said pipes.

6. A milking installation as claimed in claim 5, each said suspending means comprising an element having a locking member which upon release permits the retraction of a flexible member supporting the clusters, said element comprising a cylinder within which a piston is movably mounted and urged by a spring, the movement of the piston being limited by the locking member, said piston moving within the cylinder upon release of the locking member to wind in the flexible member on pulleys between the cylinder and piston.

7. A milking installation as claimed in claim 6, said carriage having a hook-shaped portion that cooperates with a said suspending member so that a cluster suspended beside the carriage is picked up during passage of the carriage and carried away by the carriage.

8. A milking installation as claimed in claim 7, said hook-shaped carriage portion being contiguous to the guideway.

9. A milking installation as claimed in claim 8, said guideway comprising a sliding track for said suspending means, said sliding track being downwardly inclined in the direction of motion of the carriage and having at its forward end a catching device for the suspending means.

10. A milking installation as claimed in claim 7, said carriage comprising vertical standards mounted with rollers at their upper portions and having supporting means for the guideway at their lower ends.

11. A milking installation as claimed in claim 7, and a support mounted at each milking station for the suspending means of the clusters.

12. A milking installation as claimed in claim 11, each said support comprising a bar substantially parallel to the direction of movement of the carriage, said bar having mounted thereon suspending hooks for the suspending means of the clusters.

13. A milking installation as claimed in claim 11, said supports each comprising a bracket forming an angle with the direction of motion of the carriage and comprising a guideway for a suspending means for the clusters, and rollers on which said suspending means are mounted.

* * * * *